(No Model.)
J. W. MOORE.
Valve.
No. 229,902. Patented July 13, 1880.
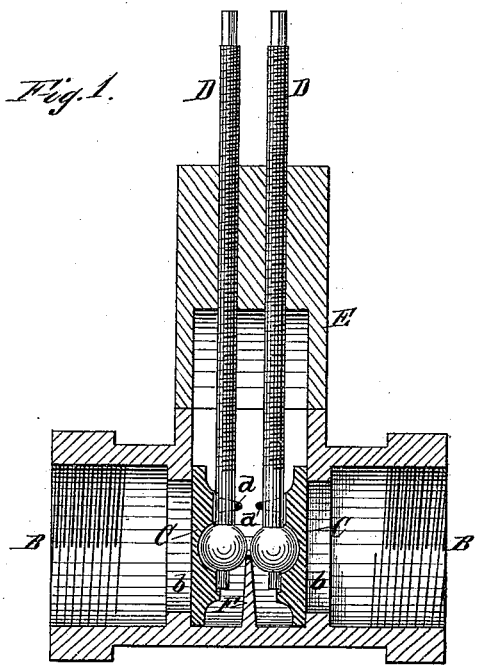
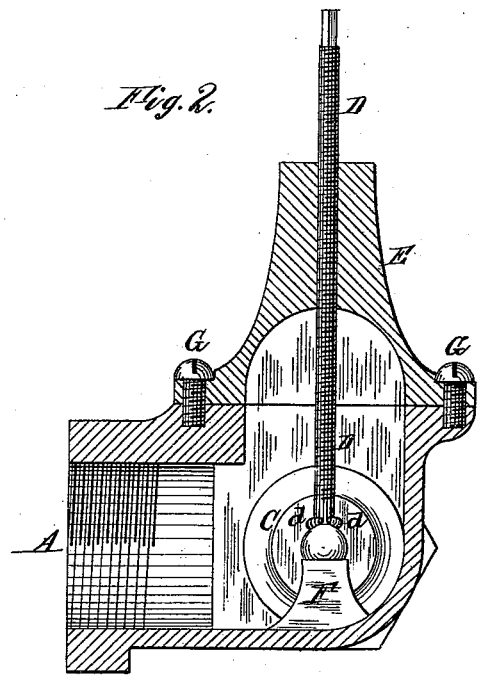
Attest:
Charles R. Searle,
Arthur M. Pierce.
John W. Moore,
Inventor:
By Worth Osgood
Attorney.

UNITED STATES PATENT OFFICE.

JOHN W. MOORE, OF LANSINGBURG, NEW YORK.

VALVE.

SPECIFICATION forming part of Letters Patent No. 229,902, dated July 13, 1880.

Application filed April 28, 1880. (No model.)

*To all whom it may concern:*

Be it known that I, JOHN W. MOORE, of Lansingburg, in the county of Rensselaer and State of New York, have invented a certain new and useful Improvement in Valves, of which the following is a full, clear, and exact description, reference being had to the accompanying drawings, and to the letters of reference marked thereon.

My invention has relation to that class of valves used upon pipes or tubes conveying water or other fluids, and wherein it is desired to regulate the flow therethrough or stop the same entirely at pleasure; and it is so arranged and constructed that when opened to its fullest extent there will be but little obstruction in the way of a free flow of the contained fluid through the same, and giving a clear opening when the sliding valve is raised up from its seat.

The chamber or case of my improved valve is also so constructed and arranged that one, two, or more outer tubes or pipes may radiate therefrom, the valve regulating the flow through each of said pipes working independently of the other or others, and the pressure of the contained fluid against the valves closing the outlet or outlets, serving to keep said valves in place and force the same more tightly against their seats.

The valves are raised or lowered by means of a screw-threaded valve-stem turned by a key, wrench, wheel, or any other desired device, the threads in said screws being of such a size that the amount of fluid passing the valve may be regulated with the greatest nicety.

My improved valve is of such a character that it may be employed upon pipes or tubes of any size, being susceptible of perfect regulation or adjustment, whether made large or small, and it may be made of cast-brass, or any preferred metal, as desired.

To accomplish all of this my invention involves certain new and useful combinations or arrangements of parts and peculiarities of construction, all of which will be hereinafter first fully described, and then pointed out in the claims.

In the drawings, Figure 1 is a vertical longitudinal section of my improved valve having two outlets from the supply-pipe, and showing the valves covering the openings as closed down thereon. Fig. 2 is a vertical cross-section of the same, showing the arrangement and construction of but one valve.

Like letters of reference, wherever they occur, indicate corresponding parts in both the figures.

A is the inlet-opening into the valve-chamber, screw-threaded to receive the supply-pipe and for the purpose of attaching the same thereto in the usual manner.

B B are the openings forming the outlets from the valve-chamber, and are likewise screw-threaded for the reception of the necessary pipes or tubes. Upon the inner end of opening B is located the valve-seat *b*, made smooth in order to secure a perfectly-tight contact or joint when the valve is placed thereupon.

C C are the valves closing the openings *b*. This valve C is of cast metal, and is of such a size and shape as to exactly close the opening *b* when placed thereupon, and projecting far enough over the edges thereof to form the desired union for rendering the valve secure upon its seat. Upon the back of C is a depression or hollow, having cast upon each side thereof, or riveted thereto, arms or projections *d*, for the purpose of bending around the valve-stem D and securing the valve-stem thereto when in place.

D D are the valve-stems, extending down through screw-threaded perforations made for that purpose in the upper portion of the valve-chamber. These valve-stems are screw-threaded to within a short distance of their lower ends, where they are turned down to receive the two arms or projections *d*, cast or riveted upon the valves. Said projections or arms, being bent therearound, secure the same to the valve-stems, but in such a manner that the valve-stem will be permitted to turn freely therein. Below said arms the valve-stem is enlarged and made spherical or egg-shaped, and nicely fits into the indentation or hollow in the valve below said arms *d*. The upper extremities of the valve-stems are made square for the reception of a key or wrench for the purpose of turning the same, or, if desired, a wheel or any other preferred device may be located thereon for the easy manipulation thereof.

E is the upper portion of the valve-chamber, located over the valve-seats, and hollowed out to receive the valves when raised up by means of the valve-stems passing through screw-threaded perforations in E, prepared for that purpose. The hollow in E is of such a size and depth as to permit the valves to entirely clear their seats, leaving the openings *b* entirely free. This projection E may be made separable from the remaining portion of the valve-chamber for the purpose of access to the interior thereof, and for convenience in adjusting the parts. When made so separable it is secured in place by means of the screws or bolts G, of any approved pattern, passing through perforations on each side of E and engaging with screw-threaded perforations in the lower part of the valve-chamber.

F is a wedge-shaped piece of metal cast in or made separate therefrom, and then secured in any approved manner in the bottom of the valve-chamber, the point thereof projecting up midway between the two valves. When valve C is raised up the outlet in B is opened, allowing a free passage for contained fluids. When closed down by means of the screw-threaded valve-stem, the spherical or egg-shaped enlargement upon the lower extremity of said valve-stem will engage with F, forcing the valve tightly against its seat and holding the same firmly and securely thereto, said spherical or egg-shaped enlargement revolving in such a manner as to bear against both the wedge F and valve C, the bearings being so constructed and arranged that the valve-stem will continue to turn easily until the valve is completely closed down upon its seat.

When two valves are employed they will bear against the opposite sides of F in such a manner as to render the same firm and secure in place and obviate any danger of springing or leakage; and no matter what the pressure may be upon the valves, caused by contained fluids, it will only tend to force the same more securely into place.

The ease of manipulation, the perfection of adjustment to obtain any desired opening for the passage of fluids, the directness of the passage through the valve-chamber, and the perfect joint obtained between the valve and its seat, all tend to render my improved valve applicable to a great variety of uses; and when constructed and arranged substantially in accordance with the foregoing description the valve admirably answers the several purposes and objects of the invention, as previously stated.

Having now fully described my invention, what I claim as new, and desire to secure by Letters Patent, is—

1. In combination with a sliding valve of the character herein set forth, a screw-threaded valve-stem adapted to move said valve with respect to its seat, said valve-stem having a spherical or egg-shaped enlargement at the back of the valve, which enlargement bears against a wedge fixed upon the bottom of the valve-chamber, substantially as shown and described.

2. In a device of the character herein set forth, the valves C, having arms or projections *d*, valve-stems D, the lower ends of which bear against the wedge, wedge F, inlet A, and outlets B, the two portions of the valve-chamber secured together by screws G, the whole combined and arranged to operate substantially as shown and described.

In testimony that I claim the foregoing I have hereunto set my hand in the presence of two witnesses.

JOHN W. MOORE.

Witnesses:
JAMES KEMP,
C. E. FRELEIGH.